United States Patent Office 3,597,178
Patented Aug. 3, 1971

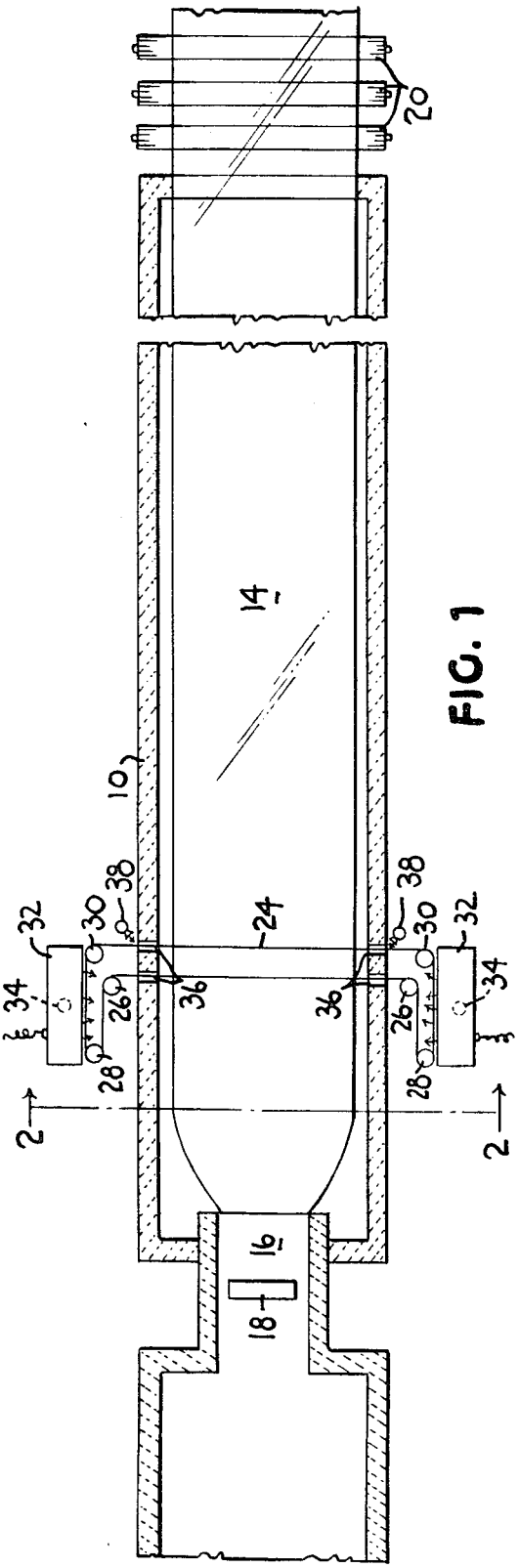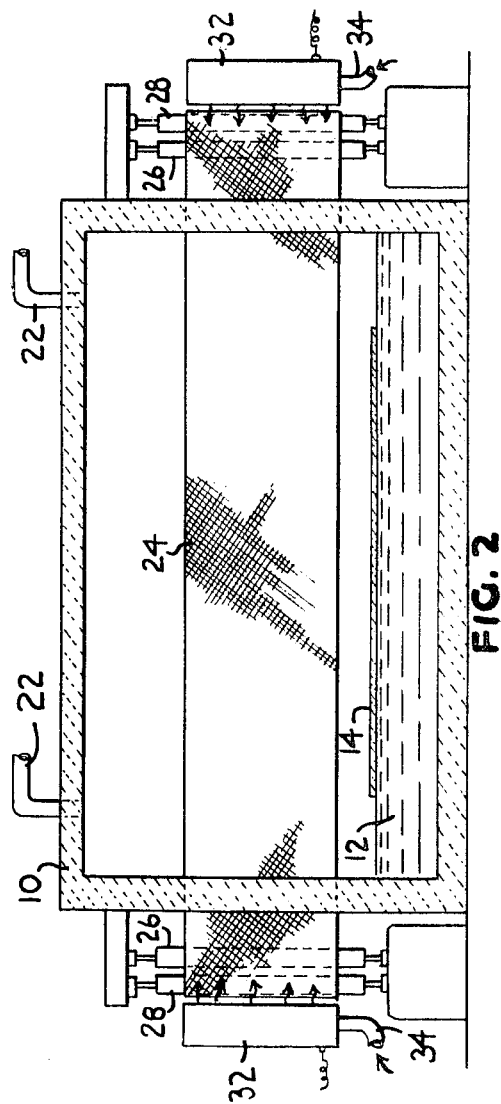
INVENTOR
ROBERT L. TILTON
BY
ATTORNEYS

3,597,178
PROCESS AND APPARATUS FOR REMOVING ATMOSPHERIC CONTAMINANTS IN A FLOAT GLASS OPERATION
Robert L. Tilton, Wexford, Pa., assignor to PPG Industries, Inc., Pittsburgh, Pa.
Filed Apr. 17, 1969, Ser. No. 817,015
Int. Cl. C03b 18/02
U.S. Cl. 65—27    8 Claims

ABSTRACT OF THE DISCLOSURE

A continuous belt of a wire mesh material is moved across the width of a float bath from locations outside the float glass bath. Tin sulfide present in the float bath atmosphere condenses onto the mesh material and is carried outside the bath where cooling of the belt occurs. The cooled belt is vibrated outside the bath to remove the condensed tin sulfide particles.

BACKGROUND OF THE INVENTION

In the float glass process, a mass of molten glass is supported on a bath of molten tin, the glass levels and becomes a ribbon which, upon cooling, is removed from the bath. To prevent oxidization and contamination of the tin of the bath, a protective atmosphere, generally a mixture of nitrogen and a small quantity of hydrogen, is maintained above the bath.

Even with the precautions of controlling the atmosphere, the atmosphere becomes contaminated with impurities which condense, fall onto the glass and damage the glass. The major impurity found in the float atmosphere is tin sulfide. The major source is the incoming glass and/or sulfur impurities in the same.

Other systems for removing impurities from a float bath atmosphere have been proposed. Examples of such systems are described in U.S. Pat. No. 3,356,476 issued Dec. 5, 1967, to J. A. Gulotta and South African application 67/1848 (based upon an earlier filed U.S. application) of R. B. Cobie. In these disclosures, a quantity of atmosphere is removed from above the tin bath and cooled to condense the impurities therein. The cooled, cleaned atmosphere is then re-introduced above the tin bath.

THE INVENTION

According to this invention, a wire mesh continuous belt is moved across the width of the float bath in the headspace above the bath from locations outside the float bath, so that tin sulfide contaminants will condense onto the belt, be carried outside the bath for removal from the belt. The belt is generally cooled or becomes cooled when moved outside the bath and will thus be slightly cooler than the bath when moved thereacross. For example, the belt is exposed to room temperature when outside the bath and exposed to temperatures on the order of 1200° F. to 1400° F. when moving over the tin bath. One or more belts are generally moved across the tin bath near the hot end because in this area, the impurities are most damaging to the hot glass. Once the glass has cooled, the impurities have little or no effect on the glass surface.

Generally, a mesh range of 15 to 50 mesh is used. If the mesh is too fine, there is retardation of atmosphere flows; if the mesh is too large, there is not sufficient surface area for condensation. The wire mesh material is moved at a relatively slow speed, as on the order of 1 to 5 ft./sec.

To remove the impurities, the belt is cooled and vibrated or brushed at its positions outside the bath.

The drawing:

FIG. 1 is a partial plan view of a float glass bath incorporating the invention; and FIG. 2 is a section taken on line 2—2 of FIG. 1.

THE PREFERRED EMBODIMENT

In the drawings, there is shown a float bath container 10, conventionally constructed of a metal shell lined with a clay refractory which contains a bath of molten metal 12, for example, tin upon which a layer of glass 14 is supported. Molten glass is delivered from a melting tank 14, over a spout 16 onto the bath 12. The flow is controlled by a vetrically movable tweel 18. The glass spreads, forms a ribbon, is cooled and is removed by rolls 20 and conveyed into an annealing lehr (not shown). To reduce oxidization of the metal of the bath, a controlled atmosphere is introduced into the headspace above the bath 12 through one or more conduits 22. The atmosphere is generally a mixture of nitrogen and hydrogen, in a mixture, for example, of 95% nitrogen and 5% hydrogen.

Even with the controlled atmosphere, contamination of the bath can occur, so that an endless mesh belt 24 supported at spaced locations by pulleys 26, 28 and 30 is provided. The pulleys are located outside the bath 10 and at least one of the pulleys is driven by a suitable driving means. All of the pulleys are suitably journaled for rotation. An electrically operated and connected vibrator 32 is positioned at the opposite sides of the bath 10 to contact a portion of the belt 24 and cause any particles which may be carried thereby to be removed from the belt. In order to cool the adhering material and the belt, the vibrators are provided with air passages so that cooling air may be directed against the belt adjacent. Air is supplied by a conduit 34.

The belt 24 passes through opposite openings 36 in the walls of the bath 10. To seal these openings against the ingress of air, jets of controlled atmosphere are directed thereagainst by nozzles 38. In lieu of this arrangement, suitable curtains may be used if desirable, or soft rollers may be employed.

I claim:
1. In the manufacture of float glass in which a body of glass is supported on a liquid bath and the atmosphere above the bath becomes contaminated with material which can contaminate the bath, the improvement comprising:
    passing a metal mesh material through the atmosphere above the bath and to a position outside the bath,
    said material being maintained at a temperature below that of the atmosphere above the bath such that atmosphere contaminants condense thereon, and
    removing said contaminants from said mesh material at said position outside bath.
2. A method as in claim 1, the step of vibrating said mesh material to remove said contaminants therefrom.
3. A method as in claim 1, the step of blowing a gas against said mesh material to remove said contaminants therefrom.
4. Apparatus for manufacturing float glass including a container, a bath of oxidizable liquid in said container upon which a body of glass is supported, means for introducing a controlled atmosphere above said bath in said container in order to reduce oxidization thereof and means for removing contaminants from said atmosphere, said means comprising:
    an endless belt of a metal mesh material,
    means to move said belt laterally across and above said bath and through the atmosphere in said container to locations outside said container, said belt being at a temperature below that of said atmosphere so that contaminants in said atmosphere condense on said belt, and
    means for removing said contaminants from said belt.

5. Apparatus as recited in claim 4 wherein said last-named means includes a vibrating means for said belt.

6. Apparatus as recited in claim 4 wherein said last-named means includes means for flowing a gas through said belt.

7. A method as defined in claim 1, characterized in that the moving of said contaminants is done by propelling a fluid against said mesh material at a position outside of said bath.

8. Apparatus as defined in claim 4, characterized in that said means for removing said contaminants from said belt comprises means for propelling a fluid against said belt.

References Cited

UNITED STATES PATENTS

| 3,326,653 | 6/1967 | LaVarte et al. | 65—182X |
| 3,494,755 | 2/1970 | Montgomery | 65—182X |

ARTHUR D. KELLOGG, Primary Examiner

U.S. Cl. X.R.

65—32, 99, 168, 182